United States Patent [19]

Shackleton

[11] Patent Number: 4,549,188

[45] Date of Patent: Oct. 22, 1985

[54] ORIFICE PLATE FOR INK JET PRINTER

[75] Inventor: Craig Shackleton, Richardson, Tex.

[73] Assignee: The Mead Corporation, Dayton, Ohio

[21] Appl. No.: 569,354

[22] Filed: Jan. 9, 1984

[51] Int. Cl.[4] .................................... G01D 15/18

[52] U.S. Cl. .................................... 346/1.1; 65/31; 156/644; 156/663; 346/75; 346/140 R

[58] Field of Search .................... 346/75, 140, 1.1; 65/43; 156/644, 663; 65/31

[56] References Cited

U.S. PATENT DOCUMENTS

| | | | |
|---|---|---|---|
| 3,645,448 | 2/1972 | Houser | 239/15 |
| 3,662,399 | 5/1972 | Yanou et al. | 346/140 |
| 3,776,461 | 12/1973 | Kashio | 239/125 |
| 4,112,436 | 9/1978 | Cone | 346/140 |
| 4,122,460 | 10/1978 | Humenik | 346/140 |
| 4,413,268 | 11/1983 | Bentin | 346/140 |
| 4,429,322 | 1/1984 | Dressler et al. | 346/140 |

FOREIGN PATENT DOCUMENTS 1444568 8/1976 United Kingdom .

OTHER PUBLICATIONS

Fillmore et al.; Ink Jet Nozzle Mounting; IBM TDB, vol. 19, No. 11, Apr. 1977, p. 4080.

*Primary Examiner*—Joseph W. Hartary
*Attorney, Agent, or Firm*—Biebel, French & Nauman

[57] ABSTRACT

An orifice plate for an ink jet printer is disclosed. The orifice plate includes a plurality of sections of glass capillaries of equal length bonded vertically in a ceramic sheet in equidistant linear alignment. The face of one end of each capillary is flush with the bottom (unexposed) face of the ceramic sheet and the other end of the capillary projects from the top (exposed) face of the ceramic sheet. The bottom face of the ceramic sheet is bonded to a rigid support plate having a plurality of openings in communication with each of the glass capillaries. A method for preparing the novel orifice plates also is disclosed.

4 Claims, 11 Drawing Figures

FIG. 1
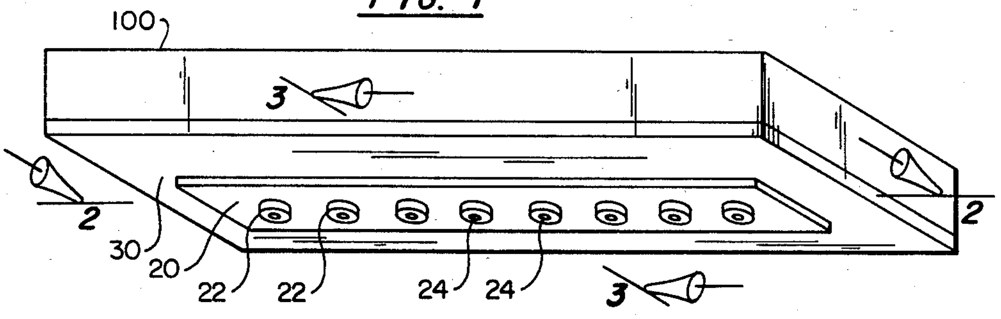
FIG. 2
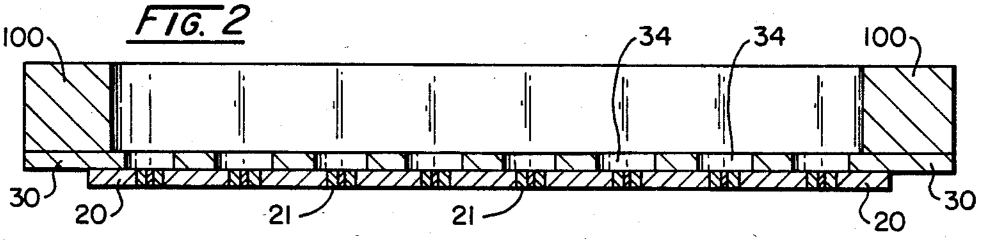
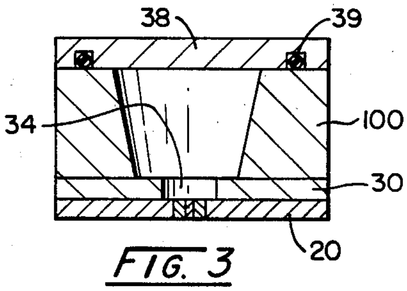
FIG. 3
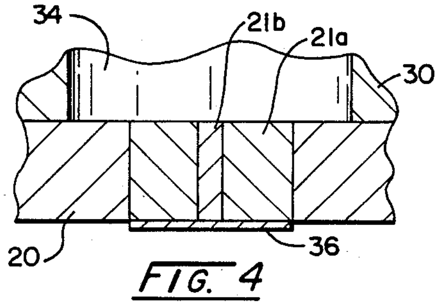
FIG. 4
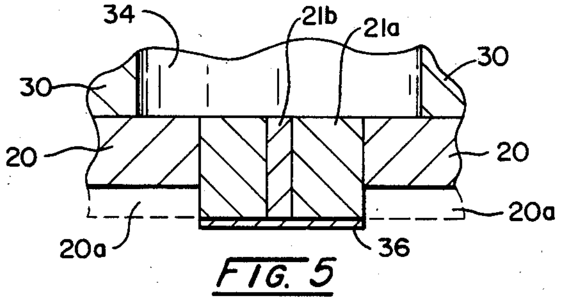
FIG. 5

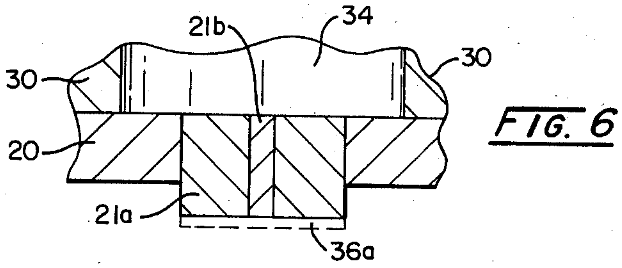
FIG. 6
FIG. 7
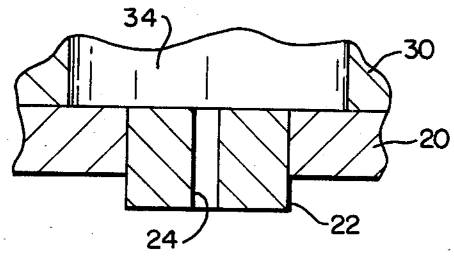
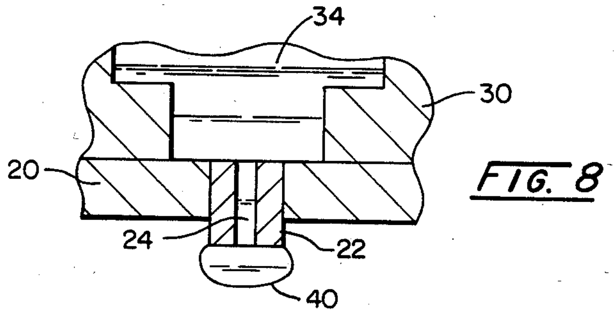
FIG. 8
FIG. 9
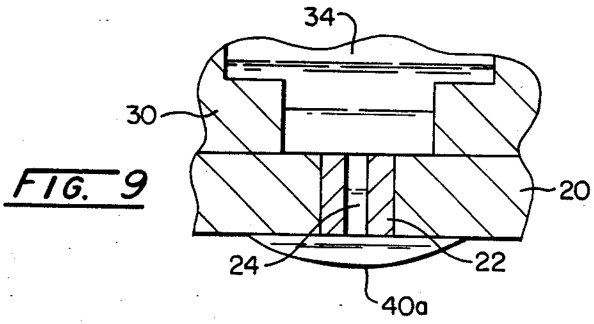

ORIFICE PLATE FOR INK JET PRINTER

BACKGROUND OF THE INVENTION

A common type of orifice plate employed in ink jet printing apparatus consists of a plurality of glass capillaries bonded vertically in a suitable sheet material such as glass or an epoxy resin. Such sheets are fabricated with relative ease by the techniques disclosed in the Cone U.S. Pat. No. 4,112,436.

The exposed surfaces of the glass capillaries in orifice plates of the above type lie in the same plane as the supporting sheet. The surface of the glass capillaries and the supporting sheet are similar with respect to being wetted by ink jet printing inks. By reason of this fact, the periodic shutdowns of the ink streams through the orifice plate can result in wetting the surfaces surrounding the orifices. Over a period of time, the spreading of the ink and its subsequent evaporation builds up ink solids on the exposed surface of the orifice plate. This buildup of solids adversely affects the subsequent start-ups of the apparatus. In time, the ink solids can accumulate to the extent that they form a grounding path to the drop charging electrodes. When this occurs, the entire apparatus must be taken out of service for replacement and/or cleaning of the orifice plate.

There is a need in the art for ink jet orifice plates including glass capillaries which have a reduced tendency to deposit ink solids on the exterior surface of the orifice plate.

SUMMARY OF THE INVENTION

The present invention provides an orifice plate for an ink jet printer having superior performance characteristics and which can be fabricated with relative ease. The orifice plate includes a plurality of sections of glass capillaries of equal length. The glass capillaries are bonded vertically in a ceramic sheet in equidistant linear alignment with the face of one end of each capillary being flush with the bottom (unexposed) face of the ceramic sheet and the other end of the capillary projecting from the top (exposed) face of the ceramic sheet. The bottom face of the ceramic sheet is bonded to a rigid support plate having a plurality of openings in communication with each of the glass capillaries.

The orifice plates are prepared from a blank which includes a plurality of cylindrical glass elements bonded vertically in a ceramic sheet in equidistant linear alignment. The cylindrical glass elements are solid glass fibers including a centrally positioned core of an acid etchable glass.

A hydrofluoric acid-resistant coating is deposited on the top surfaces of each of the cylindrical glass elements of the blank. A liquid-tight cover is attached to the other surface of the blank. The blank is then contacted with a hydrofluoric acid solution to dissolve a portion of the top surface of the ceramic sheet so that the cylindrical glass elements project from the top (exposed) surface of the sheet. Thereafter, the hydrofluoric acid-resistant coating is stripped from the cylindrical glass elements and the cores of said cylindrical glass elements are treated with an acid to dissolve said cores and provide orifices in the cylindrical glass elements.

BRIEF DESCRIPTION OF THE DRAWINGS

FIG. 1 is a perspective view of an orifice plate of the invention attached to the bottom of an ink reservoir.

FIG. 2 is a sectional view of a blank employed in the manufacture of the orifice plate of FIG. 1.

FIG. 3 is a sectional view of a segment of the blank of FIG. 2 having a plate positioned thereon to provide a liquid-tight seal over the open end of the blank.

FIG. 4 is a sectional view of a segment of the blank of FIG. 2 with a coating provided over the end of a cylindrical glass element destined to be converted into a glass capillary.

FIG. 5 is a view corresponding to FIG. 4 after a portion of the surface of the ceramic sheet has been etched away.

FIG. 6 is a view corresponding to FIG. 5 after the protective coating has been stripped from the end of the cylindrical glass element.

FIG. 7 shows a view similar to FIG. 6 after the acid soluble glass core has been removed from the cylindrical glass element by an acid treatment.

FIG. 8 illustrates the manner in which drops form on the end of the glass capillaries of the orifice plate of the present invention.

FIG. 9 is a representative of the prior art and illustrates the manner in which ink from a glass capillary can spread over an extended area of an orifice plate in which the glass capillary is positioned.

DETAILED DESCRIPTION OF THE INVENTION

Figure 7A:
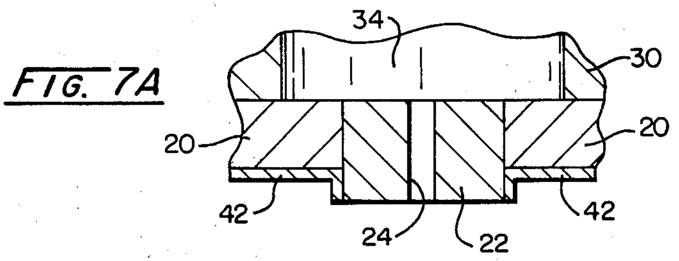
FIG. 7A is a modification of the structure of FIG. 7 in which a hydrophobic polymer coating has been deposited on the exposed outer wall of the glass capillary and the ceramic sheet.

FIG. 1 of the drawings shows a perspective view of the orifice plate of the invention in operative assembly with an ink reservoir. The orifice plate includes a ceramic sheet 20 having a plurality of glass capillaries 22 bonded vertically in sheet 20 and being in equidistant linear alignment along the major axis of sheet 20. The capillaries 22 project outwardly from the exposed face of sheet 20 typically by a distance of about 10 to 25 microns. The other ends of capillaries 22 are flush with the unseen underside of sheet 20. Each of the capillaries 22 have a centrally positioned orifice which typically has a diameter in the range of about 0.0005–0.0015 inch (about 10–40 microns). The outside diameter of capillaries 22 typically is from about three to six times the size of the diameter of the orifice.

Ceramic sheet 20 is bonded to a rigid support sheet 30 which typically is fabricated from stainless steel or other like noncorrosive metal. Support plate 30 is shown in FIG. 1 as being attached to the bottom of an ink reservoir 100. As best seen in FIG. 2, support plate 30 contains a plurality of ink reservoirs 34. Each reservoir 34 communicates with one of the glass capillaries 22 provided in the orifice plate. An enlarged view of one reservoir 34 in communication with a single glass capillary 22 is shown in FIG. 7.

Figure 10:
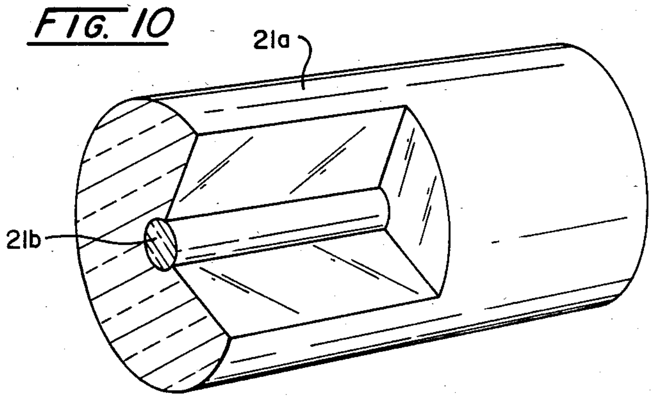
FIG. 10 is a perspective view of a single cylindrical glass element of the type included in the blank illustrated in FIG. 2.

The orifice plate of the invention can be prepared from a previously formed blank assembly as shown in FIG. 2. As shown in FIG. 2, the ceramic sheet 20 has vertically mounted therein cylindrical glass elements 21 destined ultimately to become the glass capillaries 22 shown in FIG. 1. As shown in FIG. 10, cylindrical glass elements 21 are glass fibers **21*a* having a centrally positioned core 21*b*** fabricated from a different type of glass.

The main body 21a is composed of a hard glass such as a soda-lime glass. The center core 21b is composed of an acid soluble or leachable glass such as a barium, lanthanium, or lead borosilicate glass. Glass elements of this type are commercially available from multiple sources, including Galileo Electro Optics. Their method of preparation is shown in the Hicks U.S. Pat. No. 3,294,504 and the Tasswill U.S. Pat. No. 4,212,707.

The ceramic sheet 20, for reasons to be subsequently explained, is fabricated from a ceramic material which is more rapidly etched by hydrofluoric acid than the soda-lime glass included in the shell or annulus 21a of cylindrical glass elements 21. The product sold under the trade designation PHOTOCERAN is well suited for use in the invention. The composition and method of preparing this product are shown in U.S. Pat. No. 2,971,853, which description is incorporated herein by reference. The ceramic sheet 20 is bonded to the rigid support plate 30 by any suitable means such as an epoxy-type adhesive.

The ceramic sheet 20 having cylindrical glass elements 21 vertically bonded therein can be prepared by means known in the art. One such method is a minor modification of the method disclosed in the Cone U.S. Pat. No. 4,112,436, the descriptions of which are incorporated herein by reference. A series of parallel, equidistant hemispherical or V-shaped grooves are cut in the face of a first ceramic sheet. The cylindrical glass elements are laid in these grooves. The grooves are cut so that the lower half of the glass element rests therein with its upper half exposed. A second ceramic sheet having like grooves cut in its face is laid over the glass elements. The minor voids between the glass elements and the grooves are filled with a liquid adhesive such as an epoxy resin which then is cured to a solid state. The assembly then is cut orthogonally to the axes of the cylindrical glass elements. Other methods for preparing such structures will be apparent to those skilled in the art.

In one of the steps employed to convert the blank of FIG. 2 into the finished orifice plate of FIG. 1, the face of each cylindrical glass element 21 in the fully exposed surface of sheet 20 is coated with a hydrofluoric acid-resistant coating 36 as best seen in FIG. 4. Such coatings can be laid down using known suitable photolithographic or silkscreen techniques. The fully exposed face of the rigid support sheet 30 is covered with a hydrofluoric acid resistant sheet 38 to provide a liquid-tight seal so that when the assembly is placed in a liquid bath no liquid will enter cavities 34. Suitable O-rings 39 can be employed in conjunction with sheet 38 to assist in providing such a liquid-tight seal as best seen in FIG. 3.

The blank of FIG. 2 after being protected as shown in FIGS. 3 and 4 is placed in an etching bath to dissolve a portion of the exposed surface of ceramic sheet 20. Typically, the etching bath employed for this purpose will be an aqueous hydrofluoric acid solution containing appropriate buffering materials such as sodium fluoride or ammonium fluoride. The blank will be maintained in the bath for a period of time sufficient to etch away from about 10 to 25 microns of the surface of ceramic sheet 20. The time required in the etching bath will depend upon both the hydrogen fluoride concentration and the quantity of the surface to be removed. When concentrated hydrofluoric acid is employed at ambient temperature (20° C.), the ceramic surface is removed at a rate of about 0.02–0.03 mil (0.001″) per second. Under these conditions, an etching period of 20 to 100 seconds may be employed. FIG. 5 illustrates the effect of the etching bath treatment with the phantom lines representing the portion of surface 20a of sheet 20 which has been removed by the etching treatment.

In the next step of the process, the hydrofluoric acid-resistant coating 36 is stripped from the ends of the cylindrical glass elements 21 by a suitable solvent. The phantom lines in FIG. 6 represent the coating 36a that has been removed by the chemical stripping. The orifice plate is then treated with an acid solution of a suitable concentration to dissolve the acid leachable core 21b to provide the finished glass capillaries 22 containing an orifice 24 (see FIG. 7). The type of acid, the acid concentration, and the temperature employed will depend largely upon the composition of the glass included in core 21b. It is preferred to use a lanthanium glass as it readily dissolves in 3–5 volume % hydrochloric acid at ambient temperature.

As shown in FIG. 8, when pressure on the ink is reduced the ink is drawn back into the reservoir and forms a drop 40 only on the exposed surface of capillary 22. In a prior art orifice plate in which the faces of orifices 22 are flush with the face of sheet 20, the ink drop 40a—by reason of excellent wetting of glass—extends beyond the face of orifice 22 and covers a significant area of the face of sheet 20. See FIG. 9.

In a preferred embodiment of the invention, the etched blank as shown in FIG. 5—before removing the coating 36—is dipped into an emulsion of a hydrophobic polymer such as polyvinyl chloride or a butyl rubber. Upon drying, a hydrophobic polymer coating is formed on the outer exposed surface of capillaries 22 and the face of sheet 20. After removal of the coating 36 and removal of the acid lechable core 21b, the finished orifice plate bears the hydrophobic polymer coating 42 as shown in FIG. 7A.

While the processes and products herein described constitute preferred embodiments of the invention, it is to be understood that the invention is not limited to these precise processes and products, and that change may be made therein without departing from the scope of the invention which is defined in the appended claims.

What is claimed is:

1. A method for preparing an ink jet printing plate from a blank which includes:

(i) a plurality of cylindrical glass elements, each having a centrally positioned core of an acid etchable glass, said core having a diameter of about 0.0005–0.0015 inch, each having an outer diameter from about three to six times its inner diameter;

(ii) said cylindrical glass elements being bonded vertically in a ceramic sheet in equidistant linear alignment with each face of said cylindrical glass elements being flush with one face of said ceramic sheet; and (iii) the bottom surface of said ceramic sheet being bonded to a rigid support sheet having openings therein which communicate with said cylindrical glass elements; and (iv) the ceramic in said ceramic sheet being more rapidly etched by hydrofluoric acid than the glass in the annuli of said cylindrical glass elements;

said method comprising:

(a) forming a hydrofluoric acid resistant coating on the top surfaces of each of the cylindrical glass elements of said blank and attaching a liquid-tight cover to the bottom surface of said blank;

(b) contacting the article of step (a) with a hydrofluoric acid solution for a period of time sufficient to dissolve a portion of the top surface of the ceramic sheet so that the cylindrical glass elements project from the top surface of said ceramic sheet;

(c) removing the hydrofluoric acid resistant coating from the top surfaces of said cylindrical glass elements; and (d) treating the cores of said cylindrical glass elements with an acid to dissolve said cores and provide orifices in said cylindrical glass elements.

2. A process of claim 1 in which the annuli of the cylindrical glass elements of the blank are composed of a soda-lime glass and the centrally positioned cores are composed of a barium, lanthanium, or lead borosilicate glass.

3. A process of claim 1 in which, in another step, the exposed vertical walls of the cylindrical glass elements are coated with a hydrophobic polymer.

4. A process of claim 2 in which, in another step, the exposed vertical walls of the cylindrical glass elements are coated with a hydrophobic polymer.

* * * * *